United States Patent [19]

Bertrand

[11] 3,861,442

[45] Jan. 21, 1975

[54] PNEUMATIC TIRE BEAD RING

[75] Inventor: Marcel J. Bertrand, Grivegnee-Liege, Belgium

[73] Assignee: Uniroyal AG, Aachen, Germany

[22] Filed: Jan. 26, 1973

[21] Appl. No.: 326,889

[30] Foreign Application Priority Data

Feb. 1, 1972 Germany............................ 2204746

[52] U.S. Cl. .............................. 152/362 R, 245/1.5
[51] Int. Cl. ............................................ B60c 15/04
[58] Field of Search .................. 152/362 R; 245/1.5; 57/141, 145; 140/88

[56] References Cited
UNITED STATES PATENTS

| | | | |
|---|---|---|---|
| 1,686,155 | 10/1928 | Hopkins | 245/1.5 |
| 2,620,618 | 12/1952 | Chamoux | 57/145 |
| 2,983,299 | 5/1961 | Jenkins | 152/362 R |
| 3,736,974 | 6/1973 | Lejeune | 152/362 R |
| 3,741,507 | 6/1973 | Hahn | 245/1.5 |

FOREIGN PATENTS OR APPLICATIONS 2,027,274  6/1969  Germany.......................... 152/362 R Primary Examiner—M. Henson Wood, Jr.
Assistant Examiner—Robert Saifer
Attorney, Agent, or Firm—Herbert Stern, Esq.

[57] ABSTRACT

A bead ring for tubeless pneumatic tires is disclosed. The bead ring includes a core formed by a plurality of wires or a solid shaped structure and is constructed of a non-elastic material. A plurality of layers of helically wound, closely spaced wires surround the core, and the wires of each layer are oppositely pitched with respect to the wires of adjacent layers. The combination of the core and the layers of wires form a bead bundle having a generally semi-circular cross-section.

This abstract is not to be taken either as a complete exposition or as a limitation of the present invention. The full nature and extent of the invention is discernible only by reference to, and from, the entire disclosure.

4 Claims, 9 Drawing Figures

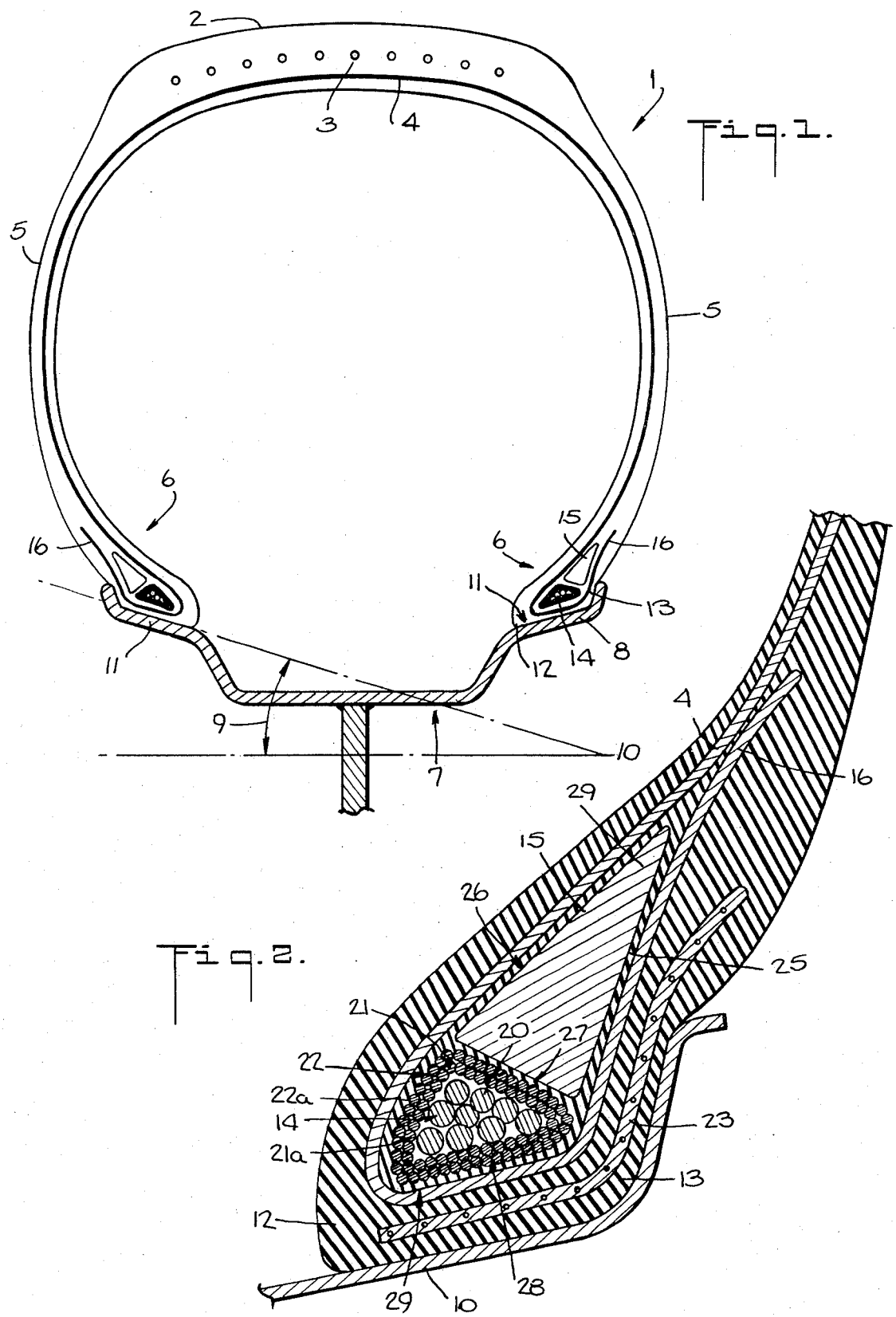

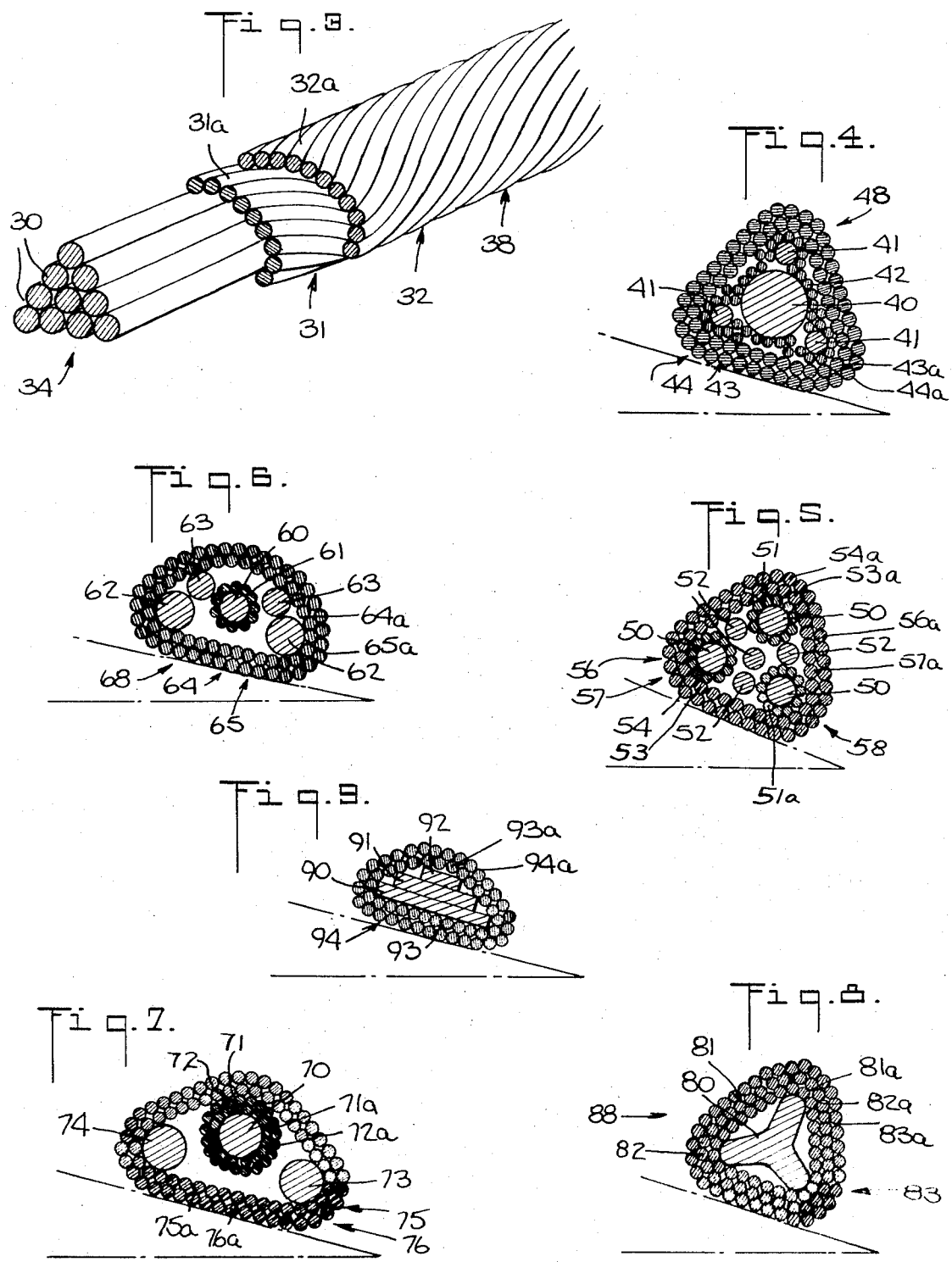

PNEUMATIC TIRE BEAD RING

This invention relates to tubeless pneumatic tires for vehicles, and more particularly to beads for such tires.

Tubeless tires of the type known in the art utilize a pair of rigid non-extensible bead rings to insure the reliable seating of a tire against the rim of the wheel on which the tire is mounted. To improve the seating of the tire on the rim shoulders of the wheel, the shoulders are frequently inclined at some small angle, generally about 15°, to the wheel axis. Due to this inclination, the radially outwardly directed force of the air pressure within the tire bears upon the toes of the beads, pressing the beads firmly against the rim shoulders. Nevertheless, it has been found that is is still possible for the beads to be separated from the rim shoulders, thereby allowing the air within the tire to escape suddenly, with possible catastrophic results. Radial tires are particularly sensitive to such failures because they have very soft and flexible sidewalls, the sidewalls being especially soft and flexible if the tire carcass is constructed with only a single ply of radially extending cords. The softness and flexibility of the radial tire's sidewall facilitates the outward twisting of the bead rings of the tire and thereby the lifting of the bead toe from the rim shoulder so that the air pressure within the tire can apply a radially outwardly directed force to the bead surface adjoining the wheel rim shoulder, thereby causing further separation of the bead from the shoulder.

SUMMARY OF THE INVENTION

It is, therefore, an object of the present invention to provide an improved pneumatic tire construction by means of which the aforesaid drawbacks and disadvantages may be most efficaceously avoided.

It is a further object of this invention to provide a bead ring for a pneumatic tire which is resistant to twisting.

It is yet another object of this invention to provide a bead ring for a pneumatic tire which provides a greater resistance to bending than bead rings presently known.

According to the invention there is provided a tubeless pneumatic tire including a carcass, a tread, and a pair of bead rings, the latter adapted to be firmly seated on a wheel rim. Each bead ring comprises a core of non-elastic material, and a plurality of layers of helically wound, closely spaced wires surrounding the core, the wires of each layer being oppositely pitched with respect to the wires of adjacent layers, wherein the combination of the core and the layers of wires has a generally semi-circular cross-section.

The foregoing and other objects and features of the present invention will be more clearly understood from the following detailed description thereof when read in conjunction with the accompanying drawings, in which:

BRIEF DESCRIPTION OF THE DRAWINGS

FIG. 1 is a cross-sectional plan view of a pneumatic tire, mounted on a wheel rim, having bead rings constructed in accordance with the invention;

FIG. 2 is an enlarged cross-sectional view of the bead areas of the tire shown in FIG. 1;

FIG. 3 is a partially sectioned perspective view of a bead bundle according to one embodiment of the invention;

FIGS. 4–9 are cross-sectional plan views of various bead bundles constructed according to the invention.

DESCRIPTION OF THE PREFERRED EMBODIMENT

Turning now to FIG. 1, there is illustrated a tubeless pneumatic tire 1 of the type used for vehicles, having, for example, a radial ply carcass. The tire includes a tread 2, a belt or breaker ply 3 and a single radial ply 4 which is comprised of a plurality of rubberized parallel ply cords. The sidewalls 5 of the tire, which are soft and flexible, terminate at their radially inwardmost portions in bead rings 6. The tire is mounted on a wheel rim 7 having shoulders 8, the shoulders forming an angle 9 of approximately 15° with the axis 10 of the wheel rim. The tire is mounted on rim 7 by firmly seating bead rings 6 against rim shoulders 8. The firm seating is effected by the radially inwardly and axially outwardly directed force of the air pressure within the tire pressing the bead contact surface 11, which is the surface extending between bead toe 12 and bead heel 13, against inclined shoulder 8. Each bead ring includes a bead core 14, at least two layers of wire surrounding the core, the core and the layers of wire, which will be discussed with regard to FIGS. 2–9, being termed a "bead bundle" and indicated at 28, and a rattail shaped filler 15 supported by the bead bundle. The ends of radial ply 4 are turned up, as indicated at 16, around the beads bundles and rattail filler units 15 thereby forming the bead rings.

Turning now to FIG. 2 there is illustrated a detailed view of a bead ring constructed according to the invention. The bead core 14 includes a plurality of core wires 20 which, to some extent, determine the cross-sectional configuration of the bead bundle, the configuration, in the example shown in FIG. 2, being generally semi-circular. It is here appropriate to note that the core may be constructed with round wires, profiled wires, flat bands or solid shaped structures, and the material used may, for example, be steel or plastics such as nylon, polyester, fiberglass or "Fiber B." A first layer 21 of helically wound, closely spaced, wires 21a, which have a diameter smaller than the diameter of core wires 20, is wound around the latter, and a second layer 22 of closely spaced wires 22a, which have a diameter similar to that of wires 21a, is wound around the wires 21a of layer 21, the two layers of wires 21a and 22a thus covering a major portion of the core. The wires comprising layer 22 are arranged to have a pitch opposite to the pitch of the wires 21a which form layer 21. It has been found that a bead ring having the configuration illustrated in FIG. 2, i.e., comprising a plurality of oppositely pitched, helically wound, closely spaced, layers of wires surrounding the core, results in a unit having both a high torsion resistance and a high bending resistance. This arrangement also provides that bead bundle 28 will have a structure which extends into the area of bead toe 12, thereby insuring that the force of the air pressure in the tire will firmly press the bead toe area against wheel rim shoulder 8. The bead heel 13 is also forcibly urged, by the air pressure within the tire, against the rim shoulder 8, and to prevent damage to the bead bundle and the turned-up radial ply in the region of the bead heel, a chafing strip 23 is inserted in the elastomeric material of the tire stock in the heel region, the chafing strip, in this example, extending from the area of bead toe 12 to the region of sidewall 5. It should be noted that, in order to improve the seating capacity of the bead ring, bead bundle 28 is so oriented that the base 29 thereof is parallel to rim shoulder 8, and this is true of the embodiments illustrated in FIGS. 3–9, to be discussed below, as well as of the embodiment illustrated in FIG. 2.

The instant structure provides a bead bundle having a cross-section of substantial relative height, thereby imparting a high torsion resistance and a high resistance to bending in the circumferential direction to the bundle. Further, the instant bundle will act as a unit because the individual wire elements 20 constituting the core are restricted from relative motion by the helically wound, oppositely pitched, outer-wire layer wrapping, and thus the entire cross-sectional width of the bundle contributes to its torsion and bending resistance. In this regard it is appropriate to note that the wound layers of wires may be made of steel or plastics of the type discussed above with regard to the core materials, and if plastic wires are used, an improved bond between the core material and the elastomeric material of the tire may be obtained.

The rattail filler 15, which is constructed of a stiff elastomeric material, has a cross-sectional shape which approximates an isosceles triangle thereby insuring that it will provide an equal resistance to bending in either axial direction, and is positioned so that its shortest side is in contact with the bead bundle. This arrangement of the bead bundle 28 and rattail filler 15, as illustrated in FIG. 2, allows a reliable tension reducing turn-up of the ply 4 during the initial shaping of the tire carcass and also provides wide support for the filler, making the tip 29 thereof especially insensitive to bending forces, resulting in a bead ring having a bending and torsion resistance which diminishes gradually as it extends towards the sidewall 5 of the tire.

Referring to FIG. 3 there is illustrated a partially sectioned perspective view of a bead bundle 38 which includes a plurality of parallel wires 30 arranged to form a core 34 in the shape of an equilateral triangle and two layers, 31 and 32, of helically wound, closely spaced, oppositely pitched wires 31a and 32a respectively, covering the core, the combination of core 34 and layers 31 and 32 forming a bundle having the desired generally semi-circular cross-section.

Turning now to FIGS. 4–9 there are illustrated cross-sectional plan views of various embodiments of a bead bundle constructed according to the invention. FIG. 4 illustrats a bead bundle 48 including a large diameter core wire 40, three core wires 41, each having a diameter smaller than that of core wire 40, positioned about core wire 40 at the points of a triangle, and a plurality of filler wires 42 filling the region about wire 40 between wires 41, the diameter of wires 42 being smaller than that of wires 41. This combination of parallel wires 40, 41 and 42, which forms the bead core, is covered by layers 43 and 44 of helically wound, oppositely pitched wires 43a and 44a respectively, each of the wires 43a and 44a having a diameter smaller than that of the filler wires 42, layers 43 and 44 serving to form with the core, an integral bead bundle 48.

FIG. 5 illustrates a bead bundle 58 comprising three large diameter core wires 50 positioned at the points of a triangle, each of the core wires 50 being helically wrapped by a layer 51 of thin wires 51a, and a plurality of wires 52 positioned in the spaces between the thin wire wrapped core wires 50, the wires 52 having a diameter less than that of wires 50. Wires 50, 51a and 52 together form the bead core which is covered by layers 53 and 54 of helically wound, oppositely pitched wires 53a and 54a respectively, thereby forming bead bundle 58 as an integral unit.

Turning now to FIG. 6 there is shown a bead bundle 68 which comprises a center core wire 60 wrapped by a thin, helically wound wire 61, two core wires 62 which are similar to core wire 60 and which are unwrapped, and two core wires 63 filling the regions between wrapped wire 60 and wires 62, the diameter of wires 63 being less than that of wires 60 and 62. Wires 60, 61, 62 and 63, which form the bead core, are bound together by two layers 64 and 65 of helically wound, oppositely pitched wires 64a and 65a respectively, thereby forming integral bead bundle 68.

FIG. 7 illustrates a bead bundle structure similar to that shown in FIG. 6 and demonstrates the fact that the core wires may be wrapped by more than one helically wound layer of wire. For example, central core wire 70 is surrounded by two layer 71 and 72 of helically pitched, oppositely wound wires 71a and 72a, while core wires 73 and 74 are unwrapped. This core structure is wrapped by helically wound, oppositely pitched, closely spaced layers 75 and 76 of wires 75a and 76a respectively, and the combination of the core and layers 75 and 76 of wires 75a and 76a, respectively, forms integral bead bundle 78. In this embodiment wrapping layers 71 and 72 provide added height to the cross-section of bundle 78 and thereby contribute substantially to the resultant increase in the bending resistance of the bead ring so constructed.

FIGS. 8 and 9 illustrate the fact that the desired generally semi-circular cross-sectional configuration of the bead bundle may be obtained by the use of solid core elements rather than by the use of wire core elements as in the previous examples. FIG. 8 includes a core 80 in a three-pointed star configuration, the points of the star being directed at the corners of an equilateral triangle. In this example three layers, 81, 82 and 83 of helically wound, closely spaced, wires 81a, 82a and 83a respectively, surround the core 80, adjacent ones of the layers 81, 82 and 83 having opposing pitches. FIG. 9 illustrates the fact that the desired cross-sectional configuration may be obtained by utilizing a plurality of flat strips of varying widths to form the bead core. In this example three strips or layers 90, 91 and 92 of varying widths are utilized, 90 being the widest and 92 being the narrowest. The three flat strips are firmly held together by being wrapped by two layers, 93 and 94 of oppositely pitched, helically wound wires 93a and 94a respectively, thereby forming integral bead bundle 98.

It will be understood that the foregoing description of the preferred embodiments of the present invention is for the purposes of illustration only, and that the various structural and operational descriptions herein disclosed are susceptible to a number of modifications and changes, none of which entail any departure from the spirit or scope of the present invention as defined in the hereto appended claims.

I claim:

1. A tubeless pneumatic tire including a carcass, a tread, and a pair of bead rings adapted to be firmly seated on the shoulders of a wheel rim, each bead ring comprising:

a circular cross-section wire having a first diameter;

three circular cross-section wires each having a second diameter, said second diameter being less than said first diameter, said three second diameter wires being arranged parallel to, and in a generally triangular cinfiguration around said first diameter wire thereby forming a core; and a plurality of layers of helically wound, closely spaced wires surrounding said core, the wires of each layer being oppositely pitched with respect to the wires of the adjacent layers.

2. A tubeless pneumatic tire according to claim 1 wherein the combination of the core and the layers of wires has a generally semi-circular cross-section.

3. A tubeless pneumatic tire according to claim 2, wherein said semi-circular cross-section combination is oriented so that the base thereof is generally parallel to one of the shoulders of said wheel rim.

4. A tubeless pneumatic tire as described in claim 1 further comprising a plurality of wires each having a third diameter filling the region about said first diameter wire and between said second diameter wires, said third diameter being less than said second diameter.

* * * * *